United States Patent

Hayatdavoudi

(10) Patent No.: US 6,258,756 B1
(45) Date of Patent: *Jul. 10, 2001

(54) SALT WATER DRILLING MUD AND METHOD

(75) Inventor: Asadollah Hayatdavoudi, San Ramon, CA (US)

(73) Assignee: Spectral, Inc., Church Point, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/236,568

(22) Filed: Jan. 26, 1999

(51) Int. Cl.$^7$ ........................................... C09K 7/02
(52) U.S. Cl. ................ 507/145; 507/103; 507/106; 507/107; 507/110; 507/112; 507/113; 507/114; 507/120; 507/141; 507/142; 175/65
(58) Field of Search .................. 507/206, 203, 507/277, 273, 274, 103, 106, 107, 141, 145, 110, 114, 142, 112, 113, 120; 175/65

(56) References Cited

U.S. PATENT DOCUMENTS

| | | | |
|---|---|---|---|
| 3,726,850 | 4/1973 | Detroit . | |
| 3,746,109 | 7/1973 | Darley | 175/66 |
| 4,045,357 | 8/1977 | Reed | 252/8.5 A |
| 4,671,883 | * 6/1987 | Connell | 507/206 |
| 4,799,549 | 1/1989 | Vinot et al. | 166/293 |
| 5,333,698 | 8/1994 | Van Slyke | 175/65 |
| 5,374,361 | 12/1994 | Chan | 507/211 |
| 5,399,548 | 3/1995 | Patel | 507/109 |
| 5,755,295 | * 5/1998 | Hayatdavoudi et al. | 175/65 |

* cited by examiner

*Primary Examiner*—Philip Tucker
(74) *Attorney, Agent, or Firm*—Wenderoth, Lind & Ponack, L.L.P.

(57) ABSTRACT

A salt water drilling mud comprising a mixture salt water, a solid phase such as pre-hydrated bentonite, attapulgite, sepiolite, and extended bentonite, among others and optionally a synthetic oil, which is mixed with at least one of five different modules. A first module contains caustic, a natural wax and a natural thinner. A second module contains components of the first module and an alkali metal aluminate prepared by reacting the first module with aluminum metal. A third module contains the components of the first module and an alkali metal phosphate and/or alkali metal silicate. A fourth module contains the components of the first module, a saturated or unsaturated carboxylic acid source, a surfactant, and a preservative. The fifth module contains a combination of the first, third and fourth modules.

43 Claims, No Drawings

SALT WATER DRILLING MUD AND METHOD

TECHNICAL FIELD

The present invention relates to drilling fluids and methods, particularly those involving drilling for oil and gas.

BACKGROUND OF THE INVENTION

The drilling of earth, as in drilling for oil, typically employs a rotary drilling apparatus including a drill bit at its lower end. The rotary drilling apparatus creates a significant amount of heat due to friction during the drilling process. Therefore, a lubricant or "drilling mud" is employed to reduce heat buildup in the drilling apparatus. In such rotary drilling of wells for oil and gas, drilling fluids are circulated into the well through hollow tubular drill pipe, past the teeth of the cutter head to sweep away the cuttings from the cutter head, and returned to the surface along with the cuttings through the annulus surrounding the drill pipe. The drilling mud is generally circulated in such a manner as to remove drill cuttings to prevent clogging of the cutter and to support the walls of the well hole. Such drill cuttings are entrained in the drilling fluid and brought to the surface with the mud and then screened out and discarded. In addition to removing drill cuttings and supporting the walls of the well hole, the drilling mud also serves to cool and lubricate the drill bit. Since the earth formations encountered during drilling can vary widely, drilling muds are generally selected taking into account the condition of the earth, and types of formations which are encountered during a drilling operation.

Drilling muds normally contain clays and/or other dispersed solids which are employed to impart desired rheological properties to the drilling mud. Not only do these clays and/or other suspended solids impart desirable thixotropic properties to the drilling mud, they also serve to coat the walls of the well with a relatively impermeable sheath, commonly termed a filter cake, which retards the flow of fluid from the well into the surrounding subterranean formations.

In addition to clays and/or other suspended particles, a drilling mud may also contain one or more weighting agents which function to increase the density of the mud to a level which will offset high pressures encountered during the drilling operation. Non-limiting examples of suitable weighting agents include heavy minerals such as barite.

One problem very commonly encountered during rotary drilling operations is the problem of lost circulation in which part or all of the drilling mud is not returned to the surface. This problem may manifest itself anywhere from moderate losses of the drilling mud, to substantial or even total losses of the drilling mud such that little or none of it is returned to the surface. Where a formation zone is identified in which unacceptably large amounts of drilling mud is lost, such formation zone is commonly termed a "thief zone", "loss zone" or a "loss circulation zone." While there are many causes for loss and/or lost circulation, non-limiting examples include those situations when the well encounters a formation of unusually high permeability or one which has naturally occurring horizontal or vertical fractures or fissures. Also, the formation may be fractured accidentally by the hydrostatic pressure exerted by the drilling mud, particularly when a change over to a relatively heavy mud is made in order to control high formation pressures.

Over the years numerous techniques have been developed to prevent or reduce loss and/or lost circulation. One common technique where the loss circulation is not so severe is to add various fluid loss agents which function to change the rheological properties of the drilling mud in order to increase its resistance to flow from the well bore into the formation. Such fluid loss agents include synthetic polymeric thickening agents such as partially hydrolyzed polyacrylamide, polyelectrolytes such as an ionic polysaccharide, various gums such as locust bean gum and guar gum, various starches, and carboxymethyl cellulose (CMC), carboxyethyl cellulose (CEC) hydroxyethyl cellulose (HEC), hydroxypropyl guar, hydroxyethyl guar, etc.

An exemplary drilling mud comprises a gelling agent, such as a solid phase bentonite, a weight agent, such as barite, and water. In addition, salt or salt water can be added to the components of the drilling mud to prepare a salt water based drilling mud. Numerous different additives to this drilling mud are also employed to control viscosity, yield point, gel strength (thixotropic properties), pH, fluid loss, tolerance to contaminants such as salt and calcium carbonate, lubricating properties, filter caking properties, cooling and heat transfer properties, and tolerance to inactive solids such as sand and silt or active native mud making clays such as smectites, illites, kaolinites, chlorites, etc. Those skilled in the art recognize that providing an acceptable drilling fluid in the field requires much labor and high material handling and transportation costs. In addition, environmental and occupational safety considerations restrict the types of additives and their amounts in the drilling muds. Also, selected additives should not have fluorescence properties, so that oil deposits on the drill cuttings can be readily identified.

Over the years, a number of drilling mud formulations have been proposed. For example, U.S. Pat. No. 3,726,850 discloses a lignin dispersing agent for dispersing clays, and the like. The lignin dispersing agent is reported to have utility in both alkaline and acidic media. A relatively low viscosity aqueous silicate solution is disclosed in U.S. Pat. No. 3,746,109, and is reported to be particularly useful in drilling through shale formations. U.S. Pat. No. 4,799,549 discloses a stable, gel-forming microemulsion comprising an aqueous solution of an alkali metal silicate, a gelling reagent, and a surface active agent (surfactant). This composition is reported to be useful for permanent or reversible plugging or clogging of subterranean formations. Also, U.S. Pat. No. 5,374,361 discloses a composition for cleaning out cased wellbores, and the like, using a fluid that includes a caustic alkyl polyglycoside surfactant formulation. This formulation is reported to be more biodegradable than previous detergent systems. A further additive encountered in aqueous drilling fluids is a metal compound, such as that described in U.S. Pat. No. 5,399,548, or a derivative of a metal compound such as a hydroxy-aluminum compound provided in a polymer, such as disclosed in U.S. Pat. No. 4,045,357. U.S. Pat. No. 5,333,698 also discloses a drilling fluid additive in combination with a white non-toxic mineral oil.

Most of the additives discussed above and those employed in the industry are utilized only as additives. That is, they cannot be provided easily, safely, and economically as a "whole mud" system specifically designed to accomplish a given drilling task. Thus, a drilling mud system is desired which can be applied in a modular fashion with one or more modules being used as needed for a particular set of requirements. Such a system should also enable a person skilled in the art to convert an old mud formulation, e.g., salt muds, lime muds, low solid muds, oil muds, synthetic oil mud, etc., into such a modular system.

There is also an urgent need for improved labor health and safety in working with drilling muds, improved cleanliness of rig floor and equipment, environmental safety and non-toxicity of additives, as well as reduced handling and storage costs.

To solve the problems of the prior art, the present inventors developed a modular drilling mud or fluid system. This modular drilling fluid or mud is described U.S. Pat. No. 5,755,295. This modular drilling fluid system can be conveniently formulated as at least one of the following modules:

(1) an alkaline first module that contains a source of caustic, a natural wax, and a natural thinner;

(2) a second module prepared by reacting aluminum metal with the components of the alkaline first module thereby forming a soluble alkali metal aluminate;

(3) a third module containing the components of the first module in combination with at least one of an alkali metal phosphate, alkali metal borate and sodium silicate;

(4) a fourth module containing the components of the first module in combination with a $C_{1-24}$ saturated or $C_{2-24}$ unsaturated carboxylic acid source, a surfactant, and a preservative; and (5) a fifth module containing the components of the first module in combination with a carboxylic acid source, a surfactant, a preservative, and at least one of an alkali metal phosphate, alkali metal borate and sodium silicate.

It has further been discovered that a combination of glycerol and phosphoric and/or boric acid added to any one of the forgoing modules can further improve some properties of a drilling mud in which the module is added. The improved properties include lubricity of the drilling mud, mud thinning and mud viscosity controlling, decrease in the bit "balling" tendencies, decrease in the cohesive or shearing resistance beneath the drill bit and improved control of phase separation of the mud. This modified modular drilling fluid, mud and associated methods of using the modified fluid and mud are the subject U.S. patent application Ser. No. 09/083,051, filed on May 22, 1998.

SUMMARY OF THE INVENTION

The present invention is for a salt water drilling mud comprising a salt water, a solid phase selected from the group consisting of pre-hydrated bentonite, attapulgite, sepiolite, vermiculite, other of the so called 2:1 and 2:1:1 clays and extended bentonite, optionally a synthetic oil, and at least one of the following modules:

(1) an alkaline first module that contains a source of caustic, a natural wax, and a natural thinner;

(2) a second module prepared by reacting aluminum metal with the components of the alkaline first module thereby forming a soluble alkali metal aluminate;

(3) a third module containing the components of the first module in combination with at least one of an alkali metal phosphate, borate and sodium silicate;

(4) a fourth module containing the components of the first module in combination with a saturated or unsaturated carboxylic acid source, a surfactant, and a preservative; and (5) a fifth module containing the components of the first module in combination with a saturated or unsaturated carboxylic acid source, a surfactant, a preservative, and at least one of an alkali metal phosphate, borate and sodium silicate.

In addition, each of the forgoing modules can further contain additional components of glycerol, phosphoric acid and/or boric acid, and optionally a gel to any one of the modules of the above modular drilling mud or fluid system.

The addition of the glycerol with phosphoric and/or boric acid to the modular drilling mud system described above gives the following additional benefits:

(1) a boost in the lubricity of the modular drilling mud or fluid system, (2) a boost in the mud thinning or mud viscosity controlling power of the modular drilling mud or fluid system, (3) a decrease in the strength of the clay particle bond between the drilled clays and the drill bit, or a decrease in bit "balling" tendencies, (4) a decrease in the rock cohesive or shearing resistance immediately beneath the drill bit, or work front due to penetration of low surface tension dispersants like borates, phosphates and the like into the clay bonds and reduction in capillary entrance pressure due to low surface tension(5 to 35 dynes/cm or the present formulation, and (5) control of phase separation of the modular drilling mud or fluid system and control of the excessive loss of the mud filtrate to which the modular drilling mud or fluid system is added.

A drilling mud containing any of the third, fourth and fifth modules can be used for simultaneous, deagglomeration, deflocculation, thinning and lubricating operations. A drilling mud containing the second module can be used for thickening operations.

It has been surprisingly discovered that a salt water based drilling mud comprising salt water, a solid phase selected from the group consisting of pre-hydrated bentonite, attapulgite, sepiolite, vermiculite, other 2:1 clays and 2:1:1 clays and extended bentonite, optionally a synthetic oil, and at least one of the modules of the modular drilling fluid system of U.S. Pat. No. 5,755,295 or U.S. patent application Ser. No. 09/083,051 is extremely effective as a drilling mud.

The drilling mud of the present invention allows for shorter drilling times than prior drilling fluids and stabilizes the well bore in shales. In addition, the drilling mud of the present invention, by virtue of is salt water base is environmentally friendly and meets all of the current Federal Government requirements. This allows the drilling mud of the present invention to be used in offshore drilling operations, in addition to on- shore drilling operations.

Further, the drilling mud of the present invention has the ability to mitigate or eliminate the formation of hydrates which tend to clog a drill pipes, risers, flow lines, chokes and diverters, thereby increasing down time and danger to rig operating personnel due to the need to remove the clog in the flow path. Furthermore, the clogging hydrates increase the back pressure on the formation which could uncontrollably fracture the formation. The consequences of fracture could be disastrous to the rig and human life since the rig could topple and/or catch fire.

Typically, visual inspection of a salt water based mud reveals that the mud looks foamy. It has been discovered that the addition of any one of the modules of the modular drilling fluid, in particular the fifth module and especially the fifth module containing the addition components of glycerol and phosphoric and/or boric acid, to a saltwater-based drilling mud, the foamy nature of the mud tends to disappear. This is even true when the surface tension drops, the treated salt water-based drilling mud does not exhibit a foamy appearance.

In addition, salt water-based drilling muds are typically "gritty", having a consistency of sour milk or cottage cheese.

However, the addition one of the module of the modular drilling fluid, in particular the fifth module and especially the fifth module containing the addition components of glycerol and phosphoric and/or boric acid, the mud is transformed into a fluid which flows very smoothly, which has the flow characteristics of a fresh water mud.

It has also been discovered that drill cutting can be easily removed from the salt water based drilling mud when the salt water based contains one of the modules of the modular drilling fluid, in particular the fifth module and especially the fifth module containing the addition components of glycerol and phosphoric and/or boric acid. The efficiency of the solids removal equipment is increase drastically by the addition of the one of the modules of the modular drilling fluid.

The addition of one of the modules of the modular drilling fluid, in particular the fifth module and especially the fifth module containing the addition components of glycerol and phosphoric and/or boric acid, lowers the gel strength of a salt water-based drilling mud. Normally, when the gel strength of a drilling mud is low, the drill cuttings will settle at the low side of the well, especially in a directional well, usually causing the drill to become stuck. Surprisingly, it has been discovered the salt water mud of the present invention, has a low gel strength but still allows the cuttings to be removed from the well. In addition, the fragile gel strength of present salt water based drilling allows the easy movement of the drill and/or casing. When casings are slipped into the well, the gel will break down to allow the pipe to be run into the hole smoothly. This is highly unusual for salt water-based drilling muds. In essence, the addition of one of the modules of the modular drilling fluid to a salt-water based mud allows the drilling mud to exhibit a thixotropic property. This prevents breaking of the formation which sometimes occurs with muds having a high gel strength.

Another aspect of the present invention is a drilling method employing an instant drilling mud. Such method comprises injecting at least one of the aforementioned modules into a borehole prior to or during drilling, and commencing or continuing drilling into the earth.

DETAILED DESCRIPTION OF THE INVENTION

The present invention is for a salt water based drilling mud, a drilling mud system and associated method for using the system. The drilling mud system is comprised of one or more modules of prepackaged chemical components.

The salt water based drilling mud, without the addition of at least one of the drilling fluid modules, is typical of those salt water based drilling muds known to those skilled in the art. This mud contains salt water, a solid phase selected from the group consisting of pre-hydrated bentonite, attapulgite, sepiolite, vermiculite, other of the so called 2:1 and 2:1:1 clays and extended bentonite, and optionally a synthetic oil.

The so called 2:1 and 2:1:1 clays are known to thoses skilled in the art. The numbering system represents the crystalline structure of the clay. For example, a 2:1 clay has a two tetrahedral layers sandwiching an octahedral layer. An example of a 2:1 clay includes, but is not limited to bentonite. A 2:1:1 clay has an additional layer between the tetrahedral layers, usually of iron or magnesium. An example of a 2:1:1 clay includes, but is not limited to chlorites.

The salt water of the mud can be either saturated or unsaturated with salt. Preferably, the salt in the salt water is an alkali or alkaline earth metal salt. Sea water can also be used. However, it is preferred that the salt water be saturated with the salt.

In addition, the salt water based drilling mud of the present invention optionally contains a synthetic oil. Examples of synthetic oils include, but are not limited to, $C_8$, $C_{10}$, $C_{12}$ polyalphaolefin or carboxylic acid esters.

Mixed metal hydroxides can also be added to the salt water drilling mud to improve the properties of the mud. Typically, mixed metal hydroxides are added as a thickener for the drilling mud as can be seen in U.S. Pat. No. 4,664,843, which is incorporated by reference. A commercially available mixed metal hydride can be obtained from Dowell-Schlumberger.

Each module contains flexible concentrations of its various chemical components, which permits a user to achieve a desired level of deagglomeration of cuttings like "gumbo" shale, deflocculation of the mud, thinning, thickening, and lubricity in the drilling fluid system. The prepackaged modules can be employed either alone or in combination with another module to produce a drilling mud system having the desired properties. Each of these modules is discussed separately herein below.

Module 1

Module 1 is the principal drilling fluid additive of the instant drilling mud. It can be used alone or in combination with one or more of the other modules as discussed herein below. Module 1 is a caustic (alkaline) drilling mud. Caustic can be sodium or potassium hydroxide. This composition further comprises one or more natural waxes and one or more natural thinner. Typically the pH of a Module 1 formulation is 11 or greater. Such a high pH increases the dispersability of the mud, thereby facilitating the drilling operation.

A natural wax used in this composition facilitates the formation of emulsions and assists in coating solid particles released by drilling. Exemplary natural waxes which can be used in the composition are montan wax, waxes extracted from carnauba palm tree, cotton lintres, lignite deposits, and the like.

A natural thinner is also provided in Module 1, and as used herein refers to a natural colloidal clay dispersion. Exemplary natural thinners include lignins, tannins and negatively charged derivatives of humic acid.

The combination of caustic, natural wax, and natural thinner as described above is sometimes referred to herein as a "scour kier liquor", or its equivalent lignin and tannins and is a principal ingredient of the instant drilling mud system. Preferably, the first module is composed of a "scour kier liquor" which contains a caustic at a pH of 11 or above, as well as a natural wax and a natural thinner, such as a lignin and/or a tannin. The scour kier liquor referred to herein is typically obtained by the alkaline digestion of cellulosic fibers, e.g., cotton pulp, and is described further herein below.

A preferred scour kier liquor is commercially available from Barnhardt Industries (Charlotte, N.C.). The kier liquor may also be combined with oxidizing agents such as peroxide, sodium hypochlorite, and the like.

This module can further comprise glycerol, phosphoric acid and/or boric acid, and optionally a gel are also added. The glycerol, phosphoric acid and/or boric acid is added to produce glyceroborates e.g., glycero boriborate, and glycerophosphates.

The addition of glycerol, in accordance with the present invention, boosts the lubricity of the module. This is due to glycerol's low molecular weight and high solubility in water-based or oil based muds. Glycerol further facilitates the rapid diffusion of the modular drilling mud or fluid system in mud, porous media (e.g. rock) and clay masses adhering to the drill bit. Glycerol is added in an amount between 0.0027% by volume to 40% by volume of the module.

Phosphoric acid and/or boric acid is added to this module. Typically, the phosphoric acid and/or boric acid is added in an amount between 0.0008% and 35% by volume, assuming a 70% or higher concentration of the acid. The phosphoric acid and/or boric acid will react with the glycerol in a condensation reaction to produce a phosphate, a borate ester or combination of borophosphate esters. Due to the temperature and pressure in the bore hole, a reaction of the glycerol with phosphoric acid and/or boric acid takes place in the bore hole. This reaction product has an anionic head, comprising the phosphate or the borate which will coat, attach, or associate with the cations on the edge of the clay particles. The attraction between the anionic heads and the cations of the clay edges causes an increase in the total negative charges of the clay particles thus deflocculating or dispersing of the clay slurry or mud, clay adhering to the drill bit (so-called bit "balling" phenomenon) and the weakening of the clay "cements" holding the rock grains together.

The weakening of the clay "cements" decreases the rock resistance to the action of the drill bit through a capillary action of the filtrate of the modular drilling mud or fluid system. Once penetrating the structure of the clay "cement" through capillary pressure, the anionic heads of the phosphate, borate or combination borophosphate esters will deflocculate and weaken the cement. This is like driving a wedge between adjacent cemented particles beneath the drill bit or between the drill bit and the "balling" material In addition, the phosphate, borate or combination borophosphate esters will have tails that allow for solubility of the esters in the water phase of the drilling fluid. With this solubility, the filtrate of the modular drilling fluid is allowed to diffuse through capillary action into the porous media (e.g. rock).

The gel is optionally added to the modular drilling mud or fluid system to reduce phase separation and settling of the particles during storage. The gel further controls the excessive loss of the filtrate from the drilling mud to which the modular drilling fluid system is added. Typically, the gel is added in an amount of 0.001 lb. to 10.0 lb. per barrel.

Module 2

This module represents a mud thickener or oil solidifier in which aluminate ions have been provided. Whenever the aluminate ions are added to the drilling mud prior to pulling the drill assembly out of the hole, the gel strength of the mud increases. This means that the thixotropic properties of the drilling fluid can be changed as desired, thus permitting cuttings entrained in the mud to be suspended. This module is added to a mud system also when it loses thixotropic characteristics or allows weight material or the cuttings to settle rapidly, especially in the synthetic oil based formulations and salt water based muds. In addition, whenever any of Module 1, discussed above, and Modules 3 and 4, discussed below, are combined with oil, the addition of Module 2 causes the oil to solidify, i.e., to a rubbery or thick grease. The degree of oil solidification can be readily altered by adjusting the concentration of aluminum metal, which results in a change in the concentration of aluminate ions.

Preferably, the second module is an aluminated scour kier liquor in which aluminum metal has been reacted with the scour kier liquor to produce aluminate ions in the presence of lignins and/or tannins. The aluminate ions react with the lignins and tannins, thereby crosslinking them and increasing the cutting suspension capability of the drilling mud. Any alkali metal aluminate can be used; however, a particularly preferred alkali metal aluminate is sodium or potassium aluminate.

A preferred Module 2 formulation can be prepared by combining aluminum metal, in the form of shavings, fines, and the like, with sodium hydroxide or potassium hydroxide and water in the presence of lignins or tannins. The caustic reacts with the aluminum metal to produce sodium aluminate or potassium aluminate and hydrogen gas. Some of the aluminate ions so formed react with the lignins or tannins, thereby crosslinking them. It is believed that whenever the cross-linked product is added to a clay suspension a partially reversible net charge is placed on the clay particles, which increases the gel strength of the mud. This is clearly shown in Tables 1 and 2 of U.S. Pat. No. 5,755,295. This is a strongly desired property especially while the drilling fluid is quiescent in a horizontal, lateral, directional or deviated hole, e.g., in river crossing, environmental remediation wells, or trenching operations.

A suitable Module 2, or thickener, can be typically prepared by adding 0.2-1.5 lb. of Al metal to 1 bbl of scour kier liquor.

Module 3

Module 3 of an instant mud drilling system represents a primary thinner formulation. Functionally, this module counter-balances Module 2. In this primary thinner composition, one least one of an inorganic phosphate, an inorganic borate and an inorganic silicate is combined with a caustic thinning composition as in Module 1. Optionally, lignite can be combined with the other components of this module. The resulting formulation is a high pH super thinner that is particularly useful for poor, thick, and water thirsty muds. Considering the components of the composition, good performance at both low and high temperatures is expected.

A particularly preferred composition with a primary thinner of Module 3 comprises scour kier liquor (containing waxes and other organic materials) in combination with trisodium phosphate (TSP) and sodium silicate. Another preferred formulation includes scour kier liquor, lignite, and TSP, or a mono-, di-, or tri-sodium, potassium, or cesium phosphate, sodium acid pyrophosphate, borates and sodium silicate. When using this composition, the waxes and other organic material (or lignite when it is used) can effectively coat colloid particles to protect them from attack by contaminants while dispersing them at the same time controllably, which produces a stable suspension condition.

A preferred formulation for module 3 can be prepared by combining with 1bbl of scour kier liquor, each of 1–50 lb of trisodium phosphate, 0.25–2 lb sodium silicate, and 1–10 lb of borax. The borax is an optional component that is useful in some applications.

Whenever lignite and hot water are used in an amount of about 1.0 to 3.0 pounds per gallon of hot water and, for example, TSP is added, the viscosity of this newly discovered reaction product can be varied from about that of water, representing a thin fluid, to that of a solid tar or asphalt, a very thick material. This material can be used, for instance, to plug a fracture in the hole. This variation in viscosity is due to variations in the concentration of TSP in the composition.

Module 4

This module provides a secondary thinner formulation as well as a surfactant and preservative, which can be combined with any of the previous modules as needed.

Preferred components in this module are those which enhance the emulsification of oil, such as a saturated or unsaturated carboxylic acid rich source, e.g., vegetable oil or a natural ester such as cottonseed oil, jojoba oil, and the like. Preferably, the carboxylic acid source is a $C_{1-24}$ saturated or $C_{2-24}$ unsaturated carboxylic acid. This component affords a secondary thinning capability. Other preferred anionic or nonionic emulsifiers (surfactants) include those having a suitable HLB (hydrophilic-lipophilic balance), alkylbenzene sulfonates, tergitol, or TRITON (available from Union Carbide Corp., Danbury, Conn.).

The preservative present in this module helps to protect against bacteria and is preferably a chelating agent, such as table salt, driller salt and salts of ethylenediamine tetraacetate (EDTA) and borax. Other suitable preservatives include boric acid or derivatives thereof and salt.

A representative formulation of this module is as follows in a water base (1 bbl): 1–10 lb borax, 0.5–10 lb borateam (which includes a sulfonated alkyl benzene—anionic surfactant), and 0.2–1 lb EDTA (Na or K salt). About 0.5–10 lb of TRITON (a nonionic surfactant) can also be optionally provided.

The carboxylic acid of module 4 will also react with the organic or inorganic acid of phosphoric acid and/or boric acid, when present. This reaction occurs in the bore hole under the temperature and pressure of bore hole. The reaction product is a phosphate lipid, a borate lipid or a combination borophosphate lipid. Like the phosphate esters and borate esters described above, the phosphate lipid and borate lipids have anionic head which are attracted to the cations of the edge of the clay particles. Hence, these lipids have a similar function and effect as the esters described above.

Module 5

This module represents a combination of Modules 1, 3 and 4 discussed above. This composition is a super-thinner-dispersant-lubricant formulation that is preferably used in treatments of 0.5 to 2.0% by volume. Use of this combination of Modules 1, 3, and 4 increases the deflocculation, lubricity and thinning of a mud dramatically.

Functionally, in the combined modules a polymerized phosphate ester is formed which possesses the high lubricity properties of esters as well as the thinning capabilities of negatively charged phosphate ions. The amount of esterification can be easily altered by adjusting the concentration of phosphate.

A preferred composition for this module, is formed by combining the compositions of modules 1, 3, and 4 in the amounts detailed above with an oil base. Preferably, the oil, such as cottonseed oil or a synthetic oil like polyalpholefin (PAO), is provided in an amount up to 90% of the total volume. Preferably up to 10%, but optionally up to 20%, of the oil content can be replaced with a mineral oil, such as FGA.

The composition identified herein as formulation (I) is composed of scour kier liquor (SKL) or equivalent lignin and tannins, TSP, sodium acid pyrophosphate (SAPP), borax, borateam, cottonseed oil and water in the relative amounts indicated above.

Like module 5, each of modules 1–4 can be added to the salt water based mud in an amount of up to about 2.0% by volume, preferably about 0.25 to about 2.0%, gives superior results over previous products. Generally, approximately 1% by volume of the module is the preferred amount, obtaining optimum results. In practice, the relative module concentrations for a given drilling fluid can be changed easily by one skilled in the art to convert an existing mud to a different mud system as desired. Factors to consider in deciding upon a desired mud system include the type of hole, i.e., vertical, slanted, deviated, directional, radial, multi-radial, or horizontal, the type of formation that is being drilled, drilling economics, and environmental safety, among others apparent to one skilled in the art.

The salt water based drilling mud of the present invention can further contain a fluid loss control additive. Examples of the additives include carboxymethyl cellulose, carboxyethyl cellulose, lignite, xanthan gum or derivatives, guar gum, guar gum derivatives such as hydroxy propyl guar, starch, sodium polyacrylamide, and hydroxy methyl cellulose, ethyl cellulose and other known to those skilled in the art.

The preferred embodiment of the present invention is using module 5 as the additive for the salt water based drilling mud. In addition, it is preferred to use module 5 which also contains the glycerol, phosphoric acid and/or boric acid. This module provides the best all-around properties. Of course, other modules are effective in the present invention and have the various utilities as described above.

Each of the forgoing modules can further contain additives such as graphite, to improve the color of the composition. In addition other additives can be added to improve the smell of the modules. These additives will be readily apparent to those skilled in the art and should be selected so that the properties of the drilling mud are not adversely affected.

The invention will now be described by way of examples which illustrate the present invention but do not limit it.

EXAMPLES

Example 1

The following table shows run time and cost of repairing the Chromium coating of a Mud Motor Rotor part. saltwater-based drilling mud which contains 1.0 vol. % of module 5 drilling fluid additive. The composition of module 5 is, based on 150 gallons is 25 lb. of lignite, 4 lb. of caustic soda, 30 lb. of trisodium phosphate, 83 lb. of 150° F. water, 8 lb. of borax, 10 lb. of borateem as a surfactant, 4 lb. of boric acid, 4 lb. of phosphoric acid, 5 lb. of glycerol, 600 lb. of a vegetable oil as a carboxylic acid source, 4 lb. of bentonite (gel), and 10 lb. of graphite with the balance water (approx. 42 gallons). The following data shows the number of hours the motor was operated for the drilling operation an the cost of repairs for the motor rotor comparing the treated saltwater mud to an untreated saltwater mud.

TABLE 1

| Untreated Saltwater based mud | | Treated Saltwater based mud | |
| --- | --- | --- | --- |
| Hours Run in the Hole Before Repair | Total Cost of Repair | Hours Run in the Hole Before Repair | Total Cost of Repair |
| 33 hours | $12,157 | 102 hours | $6380 |
| 46 hours | $12,066 | 98 hours | $6412 |
| 62 hours | $14,666 | 79 hours | $7000 |
| 62.5 hours | $8,510 | ** | ** |
| 33 hour | $7816 | ** | ** |

** Indicates no additional repairs needed

TABLE 2

| Untreated Saltwater based mud | | Treated Saltwater based mud | |
| --- | --- | --- | --- |
| Average Hours Run in the Hole Before Repair | Average Repair Cost per Hours Run in the Hole | Average Hours Run in the Hole Before Repair | Average Repair Cost per Hours Run in the Hole |
| 47.4 hours | $11,043 | 93 hours | $6,597 |

As can be seen from Table 2, the total cost for repairing the motor rotor is less when the salt water mud is treated with module 5. In addition, the average hours run before repairs are needed is greater when the salt water mud is treated in accordance with this invention. In addition, the average cost of is also improved when the saltwater based mud is treated. The average run hours for the treated salt water mud is 96.2% greater than the untreated mud.

Example 2

A well was drilled in Evangeline Parish, Louisiana using a drilling mud containing fresh water, caustic soda, 2 lb. per bbl of mixed metal hydroxide (Dowell-Schlumberger), 10 lb. per bbl of bentonite gel. This mud was treated with 1.0 vol % of module 5 of the modular drilling fluid. Module 5 composition was the composition of module 5 is, based on 150 gallons, is 25 lb. of lignite, 4 lb. of caustic soda, 30 lb. of trisodium phosphate, 83 lb. of 150° F. water, 8 lb. of borax, 10 lb. of borateem as a surfactant, 4 lb. of boric acid, 4 lb. of phosphoric acid, 5 lb. of glycerol, 600 lb. of a vegetable oil as a carboxylic acid source, 4 lb. of bentonite (gel), and 10 lb. of graphite with the balance water (approx. 42 gallons).

The well was drilled to a depth of about 4150 feet, at which time a salt dome was encountered. The mud was converted to a salt mud by adding water followed by about 20% by weight of a salt to convert the fresh water system to a salt water system. The drilling was continued with an average of 25 feet per hour through the salt dome using a polycrystalline diamond compact drill bit (PDC).

It was also observed that the 10 second/10 minute/30 minute gel strength is high enough to suspend the cuttings while the fluid is quiescent (not circulating), but the same gel strength is so fragile as to not require a very high pump pressure to move or circulate the mud in the hole. Usually, when the mixed metal hydroxide and bentonite is used without module #5, the mud develops a very high gel strength, thus requiring a very high pump pressure to move or circulate the mud in the well bore. High pump pressures in turn may cause the break-down of the well bore and subsequent lost circulation, stuck pipe, etc. Furthermore, the filter cake of the mud of was compact, tight, thin, highly plastic, expanded without breaking, smooth, and highly slick due to the properties of module #5. These properties are uncommon in salt water drilling muds.

Further, the casings were placed in the borehole very easily, which is uncommon in saltwater based drilling muds.

A similar well was drilled in the same area without using the modular drilling fluid additive. This well encountered many problems such as overpull, torque and problems with running the casing The present invention has been described hereinabove with some degree of particularity in order to illustrate various aspects of the invention. However, it should be appreciated that the scope of the claimed invention is defined by the appended claims, and obvious equivalents thereof.

What is claimed is:

1. A salt water drilling mud comprising salt water, a solid phase selected from the group consisting of pre-hydrated bentonite, attapulgite, sepiolite, vermiculite, 2:1 clays, 2:1:1 clays and extended bentonite, optionally a synthetic oil, and at least one of the following drilling fluid additive modules 1)–5):
   1) an alkaline first module comprising a source of caustic, a natural wax, and a natural thinner;
   2) a second module prepared by reacting aluminum metal with the components of said alkaline first module thereby forming a soluble alkali metal aluminate;
   3) a third module containing said components of said first module in combination with at least one of an alkali metal phosphate, borate and sodium silicate;
   4) a fourth module containing said components of said first module in combination with a saturated or unsaturated carboxylic acid source, a surfactant, and a preservative; and/or
   5) a fifth module containing said components of said first module in combination with a saturated or unsaturated carboxylic acid source, a surfactant, a preservative, and at least one of an alkali metal phosphate, borate and sodium silicate;

wherein said third, fourth and fifth modules can be used for simultaneously thinning and increasing the lubricity of a drilling mud and penetrating the earth material capillaries, and said second module can be used for thickening the drilling mud.

2. The drilling mud of claim 1, further comprising a fluid loss control additive.

3. The drilling mud of claim 2, wherein the fluid loss control additive is selected from the group consisting of carboxymethyl cellulose, carboxyethyl cellulose, lignite, xanthan gum, starch, sodium polyacrylamide, hydroxy methyl cellulose, hydroxy ethyl cellulose, guar gum, hydroxy propyl guar and hydroxy ethyl guar.

4. The drilling mud of claim 1, wherein the salt water is saturated.

5. The drilling mud of claim 1, comprising saturated salt water, a solid phase selected from the group consisting of pre-hydrated bentonite, attapulgite, sepiolite, and extended bentonite, a mixed metal hydroxide, optionally a synthetic oil, and a drilling fluid comprising a source of caustic, a natural wax, a natural thinner, a saturated or unsaturated carboxylic acid source, a surfactant, a preservative, and at least one of an alkali metal phosphate, borate and sodium silicate.

6. The drilling mud of claim 5, wherein the alkali metal phosphate is selected from the group consisting of mono-, di-, and tri-sodium phosphate, mono-, di-, and tri-potassium phosphate, and mono-, di-, and tri-cesium phosphate, sodium acid pyrophosphate and the borate is a boriborate.

7. The drilling mud of claim 1, comprising up to about 2% by volume of one or more of the modules 1)–5).

8. The drilling mud of claim 7, wherein the salt water is saturated and the salt in the water is an alkaline earth metal salt or alkali metal salt.

9. The drilling mud of claim 8, wherein the drilling mud comprises module 5 present in an amount of 0.25% to about 2.0% of the drilling mud.

10. The drilling mud of claim 8, wherein the synthetic oil is present and is a $C_8$, $C_{10}$, $C_{12}$ polyalphaolefin or a carboxylic acid ester.

11. A drilling method comprising injecting the salt water drilling mud according to claim 1 into a borehole and drilling into the earth.

12. A method of reducing the formation of hydrates in a salt water drilling mud comprising adding to the salt water based drilling mud at least one of the following drilling fluid additive modules 1)–5):
   1) an alkaline first module comprising a source of caustic, a natural wax, and a natural thinner;
   2) a second module prepared by reacting aluminum metal with the components of said alkaline first module thereby forming a soluble alkali metal aluminate;
   3) a third module containing said components of said first module in combination with at least one of an alkali metal phosphate, borate and sodium silicate;
   4) a fourth module containing said components of said first module in combination with a saturated or unsaturated carboxylic acid source, a surfactant, and a preservative; and/or 5) a fifth module containing said components of said first module in combination with a saturated or unsaturated carboxylic acid source, a surfactant, a preservative, and at least one of an alkali metal phosphate, borate and sodium silicate.

13. A salt water drilling mud comprising salt water, a solid phase selected from the group consisting of pre-hydrated bentonite, attapulgite, sepiolite, vermiculite, 2:1 clays, 2:1:1 clays and extended bentonite, optionally a synthetic oil, and at least one of the following drilling fluid additive modules 1)–5):

1) an alkaline first module comprising a source of caustic, a natural wax, a natural thinner, glycerol, and an acid selected from phosphoric acid, boric acid or mixture thereof;
2) a second module prepared by reacting an aluminum metal with the components of said alkaline first module thereby forming a soluble alkali metal aluminate;
3) a third module comprising said components of said first module in combination with at least one of an alkali metal phosphate, borate and sodium silicate;
4) a fourth module comprising said components of said first module in combination with a saturated or unsaturated carboxylic acid source; and/or
5) a fifth module comprising said components of said first module in combination with a saturated or unsaturated carboxylic acid source, and at least one of an alkali metal phosphate, borate and sodium silicate, wherein said third, fourth and fifth modules can be used for simultaneously thinning and increasing the lubricity of a drilling mud thus improving penetration of a drill bit, and said second module can be used for thickening a drilling mud.

14. A salt water drilling mud comprising a mud component comprising saturated salt water, a solid phase selected from the group consisting of pre-hydrated bentonite, attapulgite, sepiolite, and extended bentonite, a mixed metal hydroxide and optionally a synthetic oil; and a drilling fluid comprising a caustic source, a natural wax, a natural thinner, glycerol, and an acid selected from phosphoric acid, boric acid or mixtures thereof.

15. The drilling mud of claim 14, wherein the drilling fluid further comprises a gel.

16. The drilling mud of claim 14, wherein the drilling fluid further comprises a fluid loss additive selected from the group consisting of carboxymethyl cellulose, carboxyethyl cellulose, lignite, xanthan gum, starch, sodium polyacrylamide, hydroxy methyl cellulose, hydroxy ethyl cellulose, guar gum, hydroxy propyl guar and hydroxy ethyl guar.

17. The drilling mud of claim 14, wherein the drilling fluid further comprises an aluminum metal which reacts with the other components of the drilling fluid to form a soluble alkali metal aluminate.

18. The drilling mud of claim 17, wherein the drilling fluid further comprises a gel.

19. The drilling mud of claim 17, wherein the drilling fluid further comprises a fluid loss additive selected from the group consisting of carboxymethyl cellulose, carboxyethyl cellulose, lignite, xanthan gum, starch, sodium polyacrylamide, hydroxy methyl cellulose, hydroxy ethyl cellulose, guar gum, hydroxy propyl guar and hydroxy ethyl guar.

20. The drilling mud of claim 14, wherein the drilling fluid further comprises at least one of an alkali metal phosphate, borate and sodium silicate.

21. The drilling mud of claim 20, wherein the drilling fluid further comprises a gel.

22. The drilling mud of claim 20, wherein the drilling fluid further comprises a fluid loss additive selected from the group consisting of carboxymethyl cellulose, carboxyethyl cellulose, lignite, xanthan gum, starch, sodium polyacrylamide, hydroxy methyl cellulose, hydroxy ethyl cellulose, guar gum, hydroxy propyl guar and hydroxy ethyl guar.

23. The drilling mud of claim 20, wherein the alkali metal phosphate is selected from the group consisting of mono-, di-, and tri-sodium phosphate, mono-, di-, and tri-potassium phosphate, mono-, di-, and tri-cesium phosphate, and sodium acid pyrophospate and the borate is boriborate.

24. The drilling mud of claim 20, wherein the drilling fluid further comprises borax.

25. The drilling mud of claim 14, wherein the drilling fluid further comprises a $C_{1-24}$ saturated or $C_{2-24}$ unsaturated carboxylic acid source.

26. The drilling mud of claim 25, wherein the drilling fluid further comprises a gel.

27. The drilling mud of claim 25, wherein the drilling fluid further comprises a fluid loss additive selected from the group consisting of carboxymethyl cellulose, carboxyethyl cellulose, lignite, xanthan gum, starch, sodium polyacrylamide, hydroxy methyl cellulose, hydroxy ethyl cellulose, guar gum, hydroxy propyl guar and hydroxy ethyl guar.

28. The drilling mud of claim 26, wherein the drilling fluid further comprises a surfactant and/or a preservative.

29. The drilling mud of claim 14, wherein the drilling fluid further comprises a saturated or unsaturated carboxylic acid source, and at least one of an alkali metal phosphate, borate and sodium silicate.

30. The drilling mud of claim 29, wherein the drilling fluid further comprises a gel.

31. The drilling mud of claim 29, wherein the drilling fluid further comprises a fluid loss additive selected from the group consisting of carboxymethyl cellulose, carboxyethylcellulose, lignite, xanthan gum, starch, sodium polyacrylamide, hydroxy methyl cellulose, hydroxy ethyl cellulose, guar gum, hydroxy propyl guar and hydroxy ethyl guar.

32. The drilling mud of claim 29, wherein the drilling fluid further comprises a surfactant and/or a preservative.

33. A drilling mud of claim 13, wherein the drilling mud comprises 0.25 to 2.0 volume percent of the drilling fluid.

34. A drilling mud of claim 14, wherein the drilling mud comprises 0.25 to 2.0 volume percent of the drilling fluid.

35. A drilling mud of claim 17, wherein the drilling mud comprises 0.25 to 2.0 volume percent of the drilling fluid.

36. A drilling mud of claim 20, wherein the drilling mud comprises 0.25 to 2.0 volume percent of the drilling fluid.

37. A drilling mud of claim 25, wherein the drilling mud comprises 0.25 to 2.0 volume percent of the drilling fluid.

38. A drilling mud of claim 29, wherein the drilling mud comprises 0.25 to 2.0 volume percent of the drilling fluid.

39. A method of reducing the cost of repair of a mud motor comprising using the salt water drilling mud of claim I as the drilling mud in a drilling operation.

40. A method of reducing the cost of repair of a mud motor comprising using the salt water drilling mud of claim 14 as the drilling mud in a drilling operation.

41. A method of reducing the operating pressure of a mud motor for circulating a drilling mud in a borehole comprising using the salt water drilling mud of claim 1.

42. A method of reducing the operating pressure of a mud motor for circulating a drilling mud in a borehole comprising using the salt water drilling mud of claim 14.

43. The method of claim 12, wherein each of the modules of the drilling fluid additive further comprises glycerol, and an acid selected from phosphoric acid, boric acid and mixtures thereof.

* * * * *